Feb. 23, 1965 R. H. KOENIG 3,170,782

GLASS CONVEYING APPARATUS

Filed Dec. 10, 1963 3 Sheets-Sheet 1

INVENTOR

ROBERT H. KOENIG

BY E. J. Holler & W. A. Schaich

ATTORNEYS

Feb. 23, 1965 R. H. KOENIG 3,170,782

GLASS CONVEYING APPARATUS

Filed Dec. 10, 1963 3 Sheets-Sheet 2

INVENTOR.
ROBERT H KOENIG
BY E. J. Holler &
W. A. Schaich
ATTORNEYS

Feb. 23, 1965 R. H. KOENIG 3,170,782
GLASS CONVEYING APPARATUS
Filed Dec. 10, 1963 3 Sheets-Sheet 3
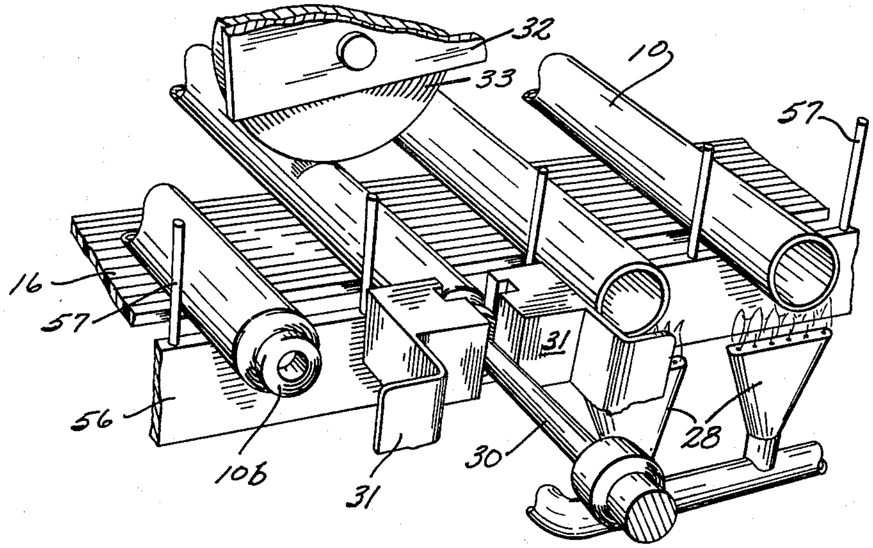
FIG. 4
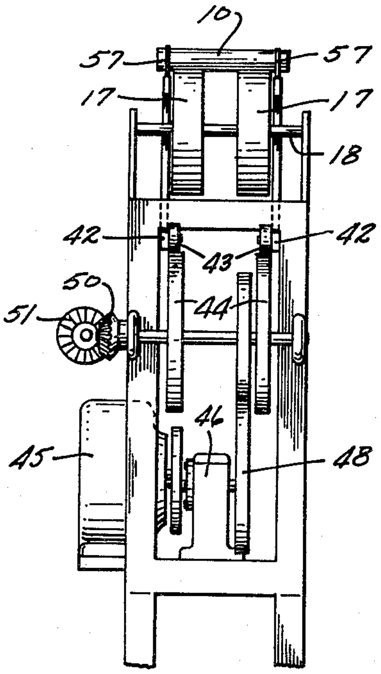
FIG. 5
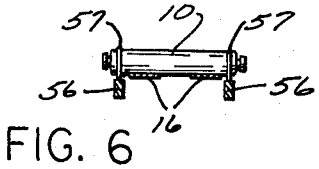
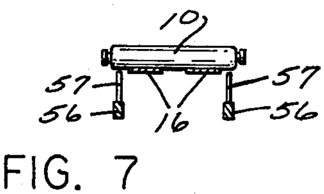
FIG. 7
INVENTOR.
ROBERT H. KOENIG
BY E. J. Holler &
W. A. Schaich
ATTORNEYS

United States Patent Office 3,170,782

Patented Feb. 23, 1965

3,170,782

GLASS CONVEYING APPARATUS

Robert H. Koenig, Vineland, N.J., assignor to Owens-Illinois Glass Company, a corporation of Ohio Filed Dec. 10, 1963, Ser. No. 329,436

9 Claims. (Cl. 65—227)

The present invention relates to improvements in apparatus and method for conveying and forming tubular glass blanks during the production of bottles, vials, ampuls, test tubes, syringe cartridges, and the like made from lengths of glass tubing.

It has been conventional practice in such operations to convey lengths of glass tubing in succession in either horizontal or inclined planes by various types of conveyor apparatus wherein the tubular blanks are continuously moved along the conveyor through various forming stations. The movable upper reach of the conveyor may be stopped at intervals to deliver the blanks at prescribed locations, however, inaccurate positioning frequently results. Also, where the blanks are moved intermittently through a series of working stations, elevating mechanisms such as those comprised of a series of vertically-movable driven rollers mounted adjacent and beneath the upper reach of the conveyor have been used heretofore for periodic retention and axial rotation of the blanks. However, these mechanisms require exceedingly more complex structural elements to facilitate elevating the blanks from contact with the main conveying means for their independent support with respect to various forming devices. Such apparatus is described and claimed in my U.S. Patent No. 2,738,622, issued March 20, 1961, entitled "Vial Necking Machines."

During reshaping operations, indexing mechanisms are preferred, particularly in the manufacture of certain articles where precise dimensional specifications are required. Such limitations require accurate alignment of glassworking tools and workpieces. The present invention provides an indexing mechanism having a simplified structure to obtain both lateral movement and accurate stationary positioning of rotated workpieces at desired locations.

Accordingly, it is an object of the present invention to provide novel conveying apparatus and method for moving a series of tubes stepwise through a series of forming stations during which the tubes are axially rotated both while retained stationarily and conveyed in order to effect various forming operations at such locations.

Another object of the present invention is to provide apparatus for intermittently conveying a series of tubular glass blanks in a lineal path in recumbent transversely-aligned relation utilizing the effect of gravity to move the tubes between spaced locations while positively retaining and axially rotating the tubes at such locations.

Another object of this invention is to provide an improved conveyor structure for intermittent movement and continuous rotation of conveyed tubular articles, the apparatus being characterized by providing positive retention of the articles in spaced-apart recumbent positions at a series of downwardly-inclined forming stations while utilizing the effect of gravity to move the articles between successive stations.

A further object of the present invention is to provide a unique method of conveying tubular glass blanks in stepwise transverse relation along a lineal downwardly-inclined path while continuously rotating the blanks both during movement and while temporarily retained at a series of working stations.

A still further object of the present invention is to provide simplified method and apparatus for transporting a plurality of similar tubular glass blanks through a series of successive heating and working stations utilizing gravity to move the blanks between adjacent stations and vertically-reciprocable retention mechanism to positively retain the blanks at the successive stations.

The more specific objects and advantages will become apparent from consideration of the following description taken in conjunction with the accompanying sheets of drawings illustrating by way of example an operative embodiment of the present invention.

In the accompanying drawings:

FIG. 4 is a perspective view of one forming station of the subject apparatus.

FIG. 5 is an end view of the subject machine.

FIG. 6 is a fragmentary sectional view taken along the line 6—6 of FIG. 1.

FIG. 7 is a fragmentary view taken along the line 7—7 of FIG. 3.

The present apparatus, in general, comprises a slightly-inclined conveyor which supports glass tubes in spaced-apart recumbent position with their axes transverse to the direction of travel of the conveyor. The conveyor provides an inclined upper reach with the primary direction of travel of the tubes extending in a lineal path from the higher to the lower elevation.

During their downward movement, the tubes revolve about their axes while each end at separate intervals moves through a preheating and softening zone in advance of a neck-forming station. The preheating and neck-forming stations are all disposed on the same plane as the inclined upper reach of the conveyor and the tubes are temporarily retained at each of the stations in accurate alignment particularly wtih respect to laterally-movable neck-forming mechanisms. The tubes remain in contact with the upper reach of the conveyor both during travel between successive stations and retention thereat.

Figures 1, 2:
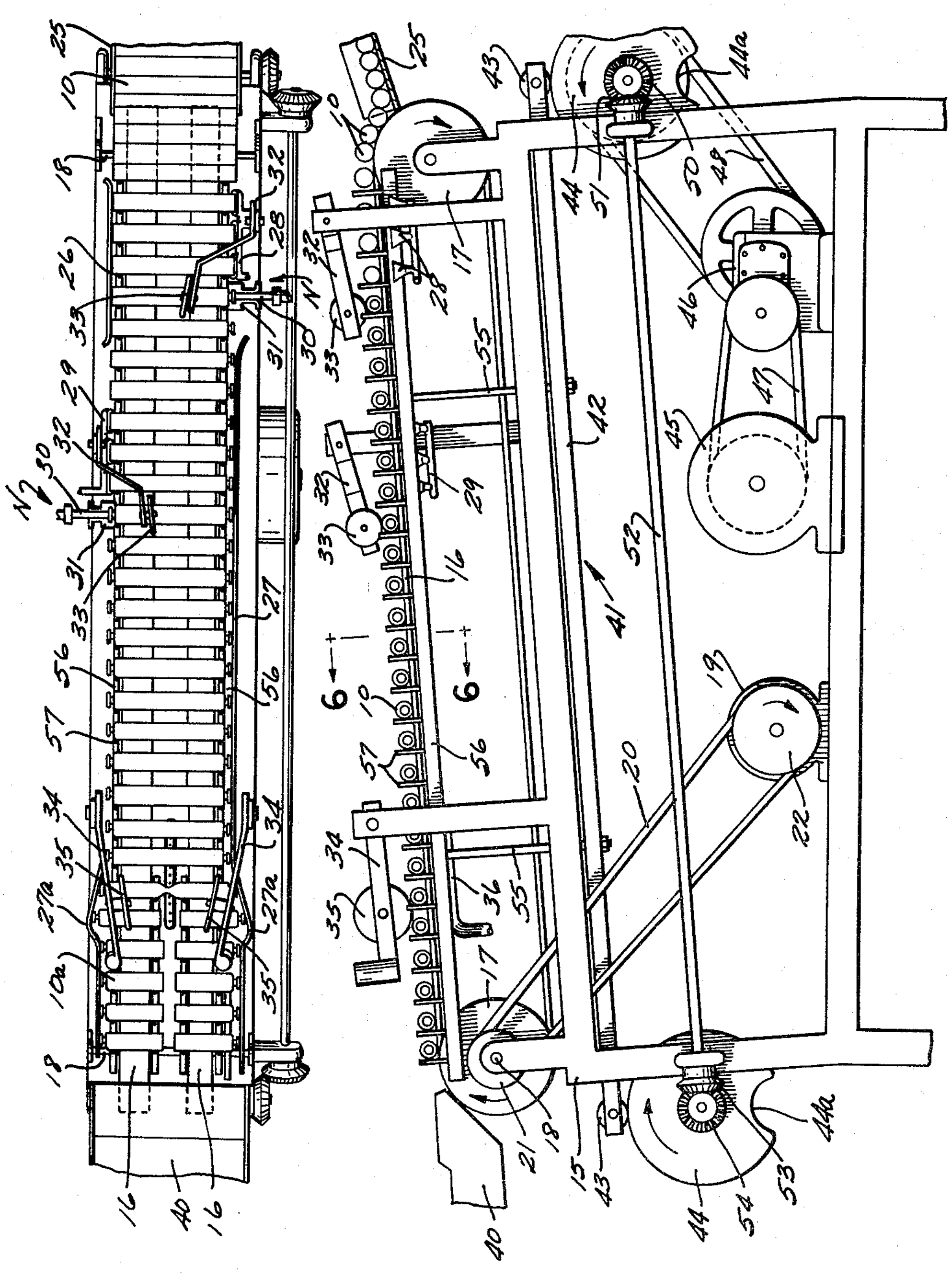
FIG. 1 is a side-elevational view of the subject apparatus.
FIG. 2 is a plan view of the apparatus.

The conveying apparatus which transports the tubes 10 from one end to the other is mounted upon a main supporting frame 15 and comprises a pair of endless metal tapes or bands 16 trained over a pair of wheels or sprockets 17 with the upper reaches of the bands riding upon suitable supporting rails. Wheels or sprockets 17 are arranged in pairs at spaced points on frame 15 in inclined relation, one pair spaced from the other. Each pair is mounted upon a cross shaft 18, one of the shafts being driven by an electric motor 19 operating through an endless belt 20 extending around another pair of sprockets 21 and 22. As shown in FIGURE 1, sprocket 21 is mounted on shaft 18 at the lower end of the conveyor along with a pair of band-driving sprockets 17. The pair of bands 16 move in the same direction at the same speed and serve to effect continuous rotation of the tubes. The upper reach of each band travels in an upward direction from left-to-right as shown in FIG. 1 counter to the primary direction of travel of the tubes over the conveyor. The pair of bands 16 frictionally engage the tubes and support the same during their conveyance as well as during their periodic retention.

A plurality of tubes 10 is placed in a suitable hopper 25 located at the right-hand end of the conveyor as shown in FIG. 1 from which the tubes are delivered onto the upper reach of endless bands 16.

As shown in FIG. 2 additional supporting and steadying of the tubes to prevent their lateral movement is provided by means of the rails 26 and 27 which engage the opposite ends of the tubes during heating and forming operations. Each of the rails 26 and 27 extends throughout an individual neck-forming region for engagement of opposite ends of the tubes for their proper positioning and retention with respect to several series of burners 28 and 29 respectively. Each series of burners 28 is aligned on the opposite side of the conveyor from opposing rail 26 and burners 29 aligned with longer opposing rail 27. Obviously, the lineal extent of each rail 26 and 27 as well as the number of burners 28 and 29 may be varied as desired or required.

The neck-forming station N located adjacent the first series of burners 28 comprises at least one laterally-movable internal forming plug 30 which cooperates with a pair of external forming jaws 31 in reshaping the heat-softened end of the tube. Either a single plug or an annular series of similar plugs such as disclosed in the aforementioned patent may be utilized in forming one end of the tubes. A freely-pivoted arm 32 is mounted at one side of the conveyor adjacent burners 28 having an angularly-disposed freely-rotatable contact wheel or disc 33 on its cantilevered end for contacting a medial region of each tube at the neck-forming station N. A similar cantilevered arm 32 having an angularly-disposed contact wheel 33 on its free end is mounted on the other side of the conveyor adjacent second neck-forming station N. Each of the contact wheels 33 serves to accurately position and retain the tube during the neck-forming operation.

At the lower end of the conveyor, rail 27 is bowed outwardly at a lowermost region 27A at the blank severing and bottoming region. A similar outwardly-bowed and laterally extending rail 27A is located at the other side of the conveyor. A series of burners 36 is mounted in a lineal path between conveying and rotating bands 16 to effect heat-softening of a medial portion of each tubular blank. A pair of cantilevered arms 34 is mounted on opposite sides of the conveyor having angularly-disposed freely-rotatable contact wheels 35 disposed at opposite angles to pull the tubular blanks apart during their conveyance. Following heat-softening and severance, the burners continue to heat the separated half-sections to produce closed flat bottoms on their separated end portions to finally form the completed containers 10A. The articles are then conveyed into receiving hopper 40 following their discharge from the conveyor.

A second vertically-movable frame 41 is mounted within suitable vertical guides within machine frame 15. A base plate 42 comprises the lower extremity of second frame 41 and has a pair of freely-rotatable small circular cam members 43 mounted on each end. Each cam member 43, attached in pairs at each end of base plate 42, is supported by a considerably larger circular cam 44 having a recess 44A in a localized region. Cams 44 are also mounted in pairs on suitable shafts at opposite ends of the conveyor.

The pairs of cams 44 mounted at the upper end of the conveyor are driven by an electric motor 45 operating through a gear-reduction box 46 and a pair of driving belts 47 and 48. A bevel gear 50 is mounted on one end of the shaft supporting the pair of cams 44 at the upper end of the conveyor. Bevel gear 50 meshes with another bevel gear 51 mounted on longitudinal drive shaft 52 which has a similar bevel gear 53 mounted on its other end. Gear 53 meshes with another bevel gear 54 affixed to the same shaft which supports the pair of cams 44 at the lower end of the conveyor. Both upper and lower pairs of cams 44 are driven at the same rate of rotation and the aligned recesses 44*a* are adapted to lower frame 42 a prescribed distance parallel to the conveyor or upper reach.

Figure 3:
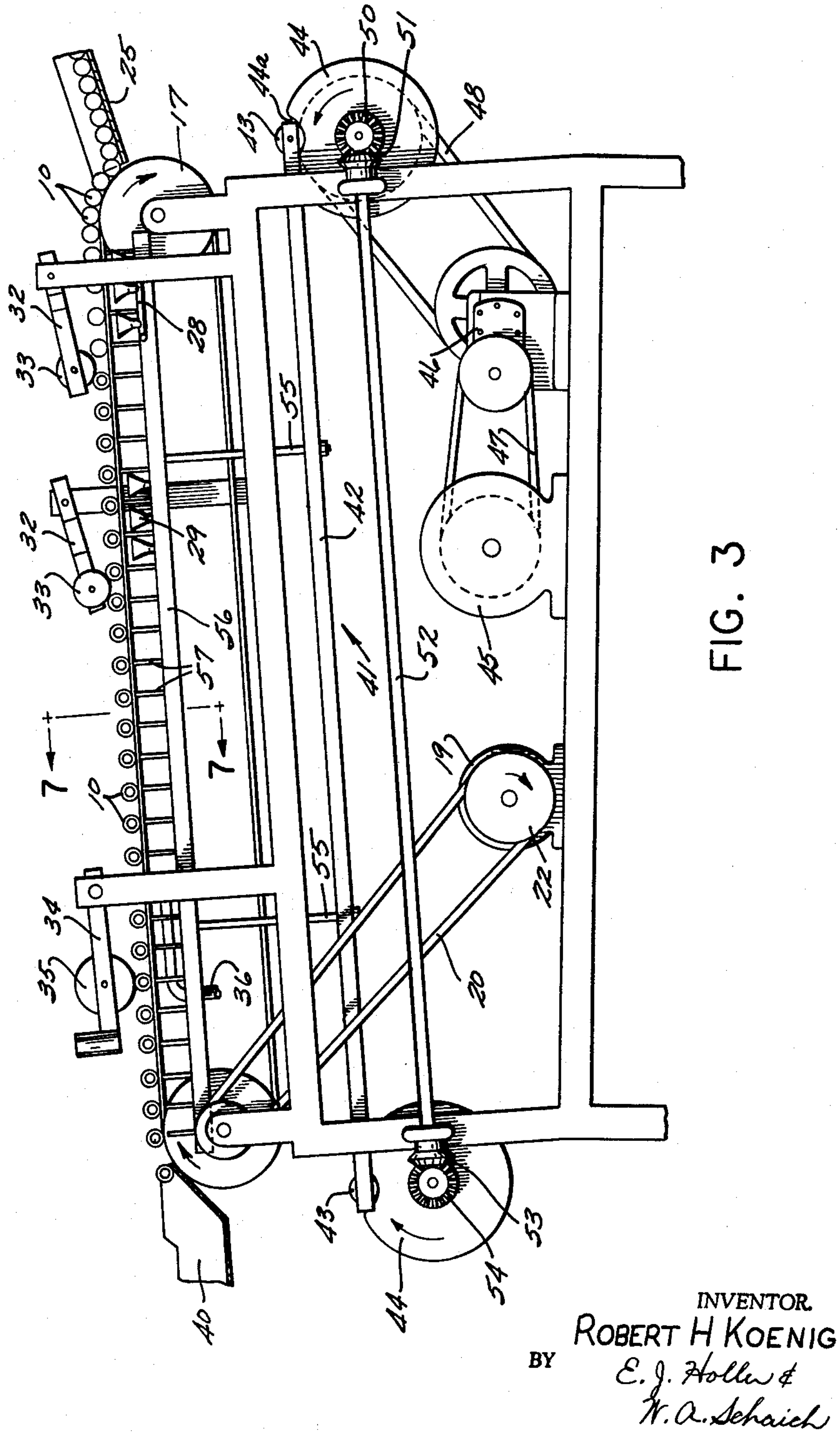
FIG. 3 is an elevational view similar to FIG. 1 showing the tubes during an interval of downward travel.

A series of rigid upright members 55 is attached to base plate 42 extending upwardly to support a pair of lineal rail members 56 which extend parallel to and on opposite sides of the conveyor upper reach. Each rail member 56 has a plurality of upright stud or lug members 57 attached to its upper surface preferably in equispaced arrangement. Lugs 57 are mounted in alignment transversely of the primary direction of travel of tubular blanks 10 and are vertically reciprocatable by cams 44 to permit their alternating downward and upward movement. The lugs are shown in their upper or raised position in FIG. 1. When the lugs are in their lowermost position as shown in FIG. 3, their upper extremities are below the upper reach of bands 16 to permit tubes 10 to roll downwardly on bands 16 under the influence of gravity. Rotation of cams 44 is timed to permit each tube 10 to start its downward travel when the lugs are lowered to be intercepted and retained by the next adjacent lugs when secondary frame 42 is raised, thus providing one-step indexing movement of the tubes. Obviously, rotation of cams 44 can be timed to permit rotating tubes 10 to move downwardly a greater distance than the spacing between adjacent lugs. At the lower end of the conveyor at the bottoming region, the lugs are mounted in series of four in transverse array to permit the retention of two newly-separated articles by the lugs. It is preferred that lugs 57 be mounted in uniformly-spaced arrangement having a uniform vertical extent less than the vertical displacement of the movable secondary frame. The lugs, rather than being disposed in pairs normal to the direction of travel of the tubes, may also be angularly aligned to facilitate movement of the tubes against rails 26 and 27 for example during their axial rotation.

The method of intermittently conveying the tubes in succession and in recumbent position through a series of working stations may be described as follows. A number of tubes is placed in a suitable hopper 25 at the upper end of the conveyor adapted to facilitate loading of the tubes onto the upper reach of bands 16. The bands serve to continuously rotate each of the tubes during its conveyance. Each of the tubes is retained by a pair of vertically-reciprocatable upwardly-extending lugs during the interval when secondary frame 42 is in its elevated position. During these periods of retention each end of the tube is passed through a series of burners to a neck-forming station N for forming a desired mouth or neck finish on the tube end. The series of lugs are all lowered simultaneously to permit the tubular blanks to roll downwardly. As the blanks roll downwardly on bands 16 they are intercepted by lugs 57 when the latter are raised to their elevated position. Normally cams 44 are rotated at such speed as to permit the tubes to advance downwardly to the next adjacent lugs for each revolution of the cams, however, the cams may also be rotated slower to permit the tubes to move downwardly through two or more lug positions prior to their interception and temporary retention.

As described hereinabove, the subject apparatus and method provide all of the motions required to tool both ends and then a medial region of a tubular workpiece on the same conveyor. Also the upright lugs may be slightly inclined from vertical to compensate for variations in diameter of the tubular blanks so that finished articles will have a consistent exterior dimension at the end finish. Normally the angle between lugs 57 and the spinner bands 16 is 90° and the centers of workpieces retained thereby fall in a plane which bisects the right angle. If the working surfaces of tools are placed parallel to this plane, then the resulting finish tooled on the tubular blanks will be the same size. The foregoing conveying method and apparatus considerably reduce the variable factors involved in end finish tooling that result in size variations.

Various modifications may be resorted to within the spirit and scope of the appended claims.

I claim:

1. Apparatus for conveying tubular blanks in succession and in recumbent position intermittently through one or more forming stations, said apparatus comprising a conveyor having a downwardly-inclined upper reach, at least one endless flat band having an upper reach extending substantially throughout the length of said conveyor, a power source for driving said band, a vertically-movable rigid frame member mounted adjacent and parallel to said flat band, a series of upwardly-extending lug members mounted on said frame member on opposite sides of said flat band, and means for moving said frame member in vertically reciprocatable relation to raise and lower said lug members with respect to said upper reach to permit intermittent retention and downward travel of said blanks.

2. Combined apparatus for conveying tubular glass blanks in succession and in recumbent position transversely in stepwise relation through one or more forming stations, said apparatus comprising at least one endless band having an upper reach disposed in downwardly-inclined relation, means for continuously driving said band to rotate said tubular blanks about their axes during their stepwise conveyance, a movable rigid frame member mounted adjacent said endless band in vertically-reciprocatable relation, a plurality of upwardly-extending lug members mounted in alignment on opposite sides of the upper reach of said endless band, and means for moving said frame member periodically vertically to raise and lower said lug members to permit alternate retention and downward travel of said blanks.

3. Combined apparatus as defined in claim 2, wherein said plurality of upwardly-extending lug members are disposed in uniformly-spaced arrangement aligned transversely with respect to the upper reach of said endless band each having a vertical extent above said band upper reach less than the vertical displacement of said movable frame member.

4. Combined apparatus as defined in claim 2, wherein said means for moving said frame member periodically vertically comprises two pairs of similar rotatable cam members, each pair supporting one end of said frame member, and driving means connecting said pairs of cam members adapted to rotate the same in synchronism.

5. Combined apparatus as defined in claim 2, including a pair of similar flat endless bands each having an upper reach disposed in downwardly-inclined parallel relation, and a power source for continuously driving said bands at the same rate of lineal speed.

6. Combined apparatus as defined in claim 2, wherein said means for continuously driving said band comprises a power source, said movable frame member being disposed parallel and essentially surrounding the upper reach of said endless band, and said means for moving said frame member periodically vertically comprises pairs of similar rotatable cam members supporting the ends of said frame member.

7. Combined apparatus as defined in claim 2, including heating means disposed in localized areas on both sides of the upper reach of said band adapted to heat-soften end portions of said blanks.

8. Combined apparatus as defined in claim 2, including a pair of similar endless bands each having an upper reach disposed in downwardly-inclined parallel relation, and heating means disposed between said bands at a lower region of the upper reach of said endless bands adapted to heat-soften a medial region of said blanks.

9. In combination, apparatus for conveying tubular glass blanks in succession and in recumbent position normal to their axes through one or more forming stations, said apparatus comprising a pair of endless bands each having an upper reach disposed in downwardly-inclined parallel relation, a power source for continuously driving said bands at the same lineal speed to continuously rotate said blanks during their stepwise conveyance, a movable rigid frame member mounted parallel and adjacent to said pair of endless bands in vertically-reciprocatable relation, a series of upwardly-extending rigid lug members mounted in juxtaposed alignment on opposing sides of the upper reach of said pair of endless bands, said lug members having vertical extent above the upper reach of said endless bands less than the vertical displacement of said movable frame member, two pairs of similar rotatable cam members with each pair supporting one end of said frame member, and motor means connecting said pairs of cam members adapted to rotate the same in synchronism to obtain vertical reciprocation of said frame member.

References Cited in the file of this patent

UNITED STATES PATENTS

| | | |
|---|---|---|
| 1,569,652 | Halvensen | Jan. 12, 1926 |
| 2,050,012 | Meyer | Aug. 4, 1936 |
| 2,203,573 | Krause | June 4, 1940 |